Aug. 2, 1955  J. WILLIAMS  2,714,372
COMPRESSED FLUID MOTORS
Filed Dec. 11, 1952  2 Sheets-Sheet 1
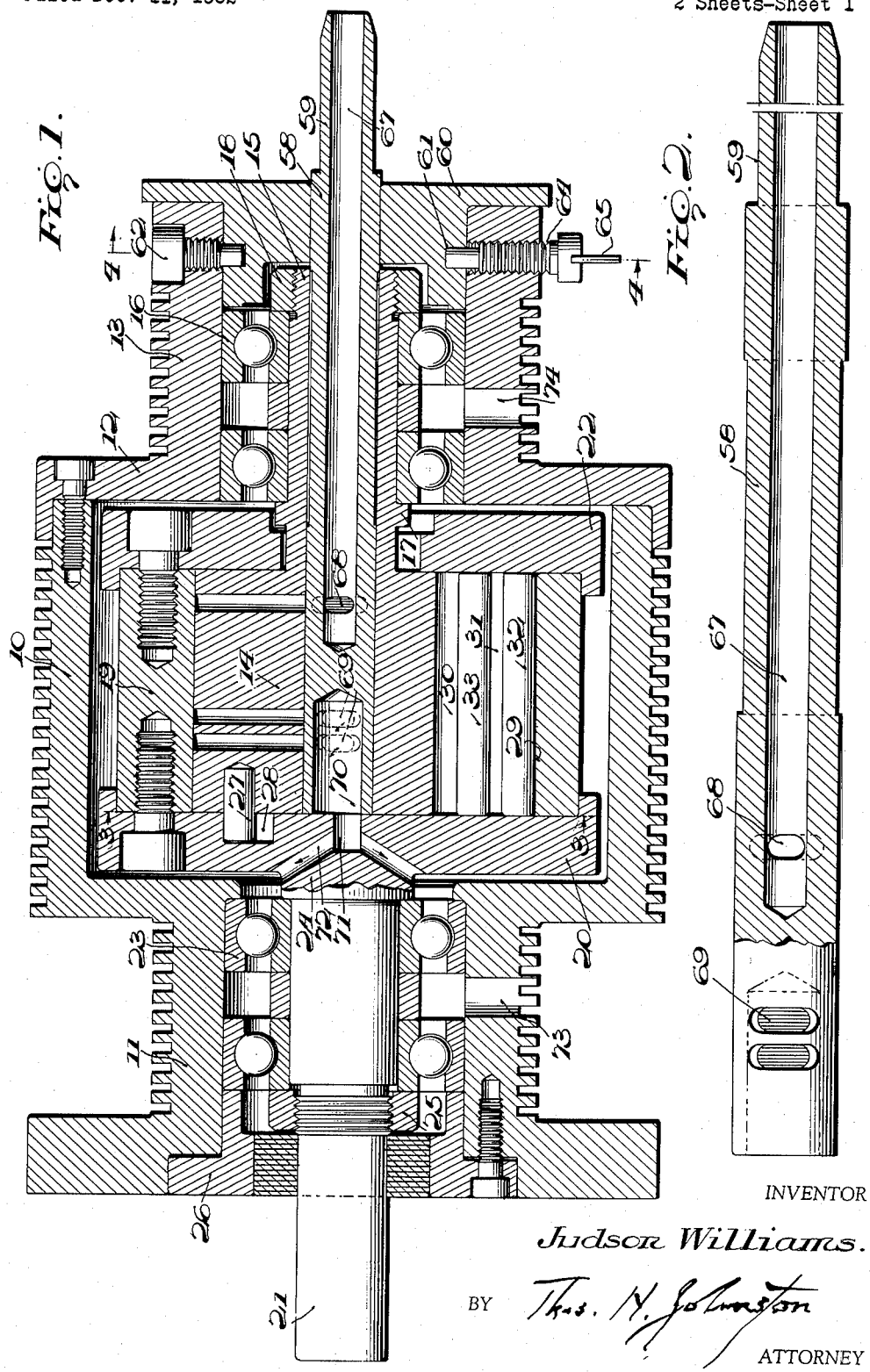
INVENTOR
Judson Williams.
BY Thos. H. Johnston
ATTORNEY Aug. 2, 1955  J. WILLIAMS  2,714,372
COMPRESSED FLUID MOTORS
Filed Dec. 11, 1952  2 Sheets-Sheet 2
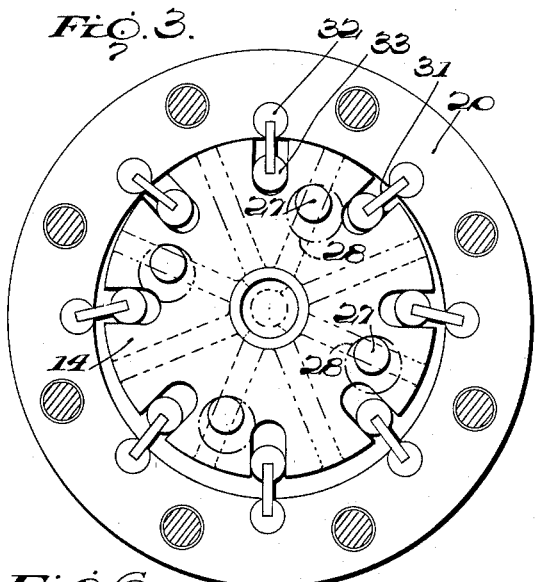
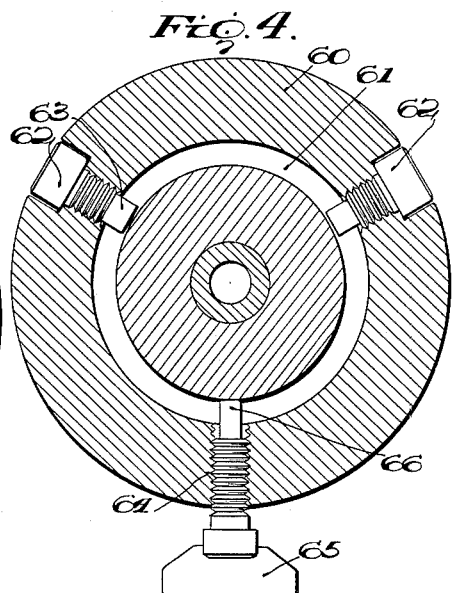
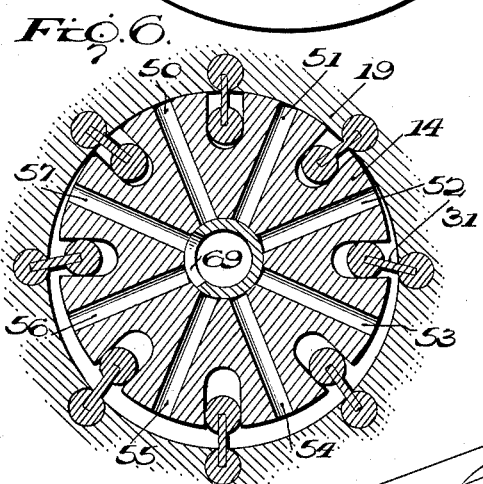
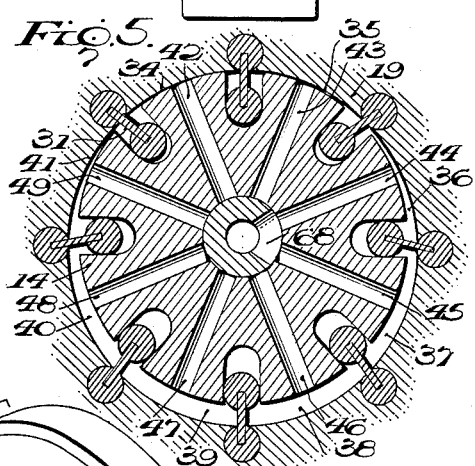
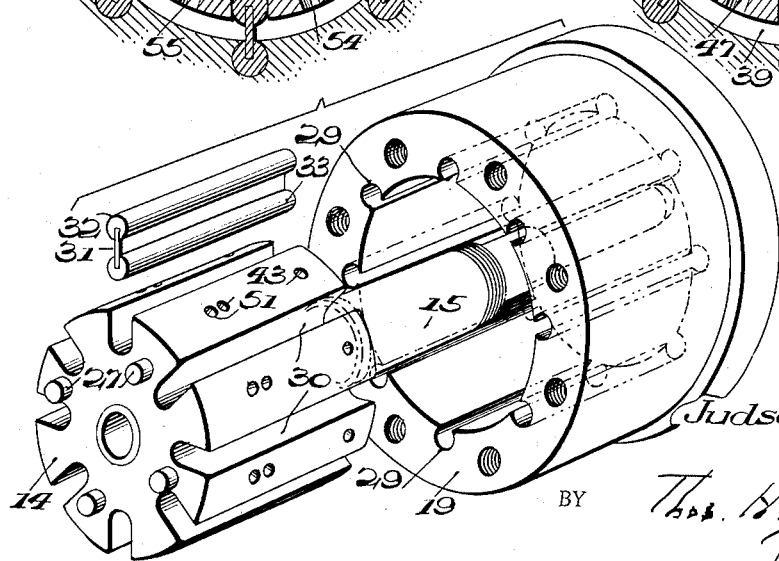
INVENTOR
Judson Williams
BY Thos. H. Johnston
ATTORNEY

United States Patent Office 2,714,372
Patented Aug. 2, 1955

2,714,372
COMPRESSED FLUID MOTORS
Judson Williams, Bensalem, Pa.

Application December 11, 1952, Serial No. 325,419

1 Claim. (Cl. 121—57)

This invention relates to an improved compressed fluid motor wherein a compressed fluid, such as compressed air or compressed carbon dioxide gas, is fed to the device for generating a torque on a power output shaft.

A salient feature of the invention resides in the provision of eccentrically offset rotors coupled to turn in unison at the same speed, and one rotor carries a plurality of vanes to coact with the other rotor and form a number of work chambers between the rotors. This assembly, as just outlined, provides, in itself, a mechanical motion capable of a wide range of use, and may be adapted to compressors, pumps, door checks, shock absorbers, and the like. In showing and describing the invention as embodied in a compressed fluid motor, I do not, therefore, wish to be limited by the specific names of parts to the single adaptation now chosen to be disclosed.

Among other objects, the invention contemplates the provision of a motor which will, as compared with other motors of the kind, combine, for given pressure of the motive fluid, relatively large power output with small size and weight, wherein, as the companion rotors employed will turn in unison at the same speed, as previously noted, the frictional drag of the vanes of one rotor against the other rotor will be reduced to a minimum, wherein, in a given work chamber, the expansion of fluid at given pressure acting to drive the torque shaft forwardly, will be sustained by the expansion of fluid at the same pressure in the next trailing work chamber, wherein the direction of rotation of the torque shaft may be readily reversed, and wherein the device will operate smoothly with a minimum of vibration.

Other and incidental objects will appear as the description of the invention proceeds, and in the drawings:

Figure 1 is a vertical, longitudinal section taken medially through the motor.

Figure 2 is a detail section of the valve employed, the forward end of the valve being shown in elevation.

Figure 3 is a transverse, vertical section on the line 3—3 of Figure 1.

Figure 4 is a transverse, vertical section on the line 4—4 of Figure 1.

Figure 5 is a transverse, vertical section showing the inlet port of the valve open.

Figure 6 is a transverse, vertical section taken through one of the dual outlet ports of the valve and showing said port open.

Figure 7 is a fragmentary perspective view particularly showing portions of the inner and outer rotors as well as one of the vanes.

Referring now more particularly to the drawings, I employ a cylindrical casing 10 provided at one end with a bearing sleeve 11. Removably bolted to the casing at its opposite end is a closure cap 12 which carries a bearing sleeve 13.

Disposed within the casing 10 is an inner cylindrical rotor 14 formed axially with a tubular shaft 15, and journaling said shaft are spaced bearings 16 fitting within the sleeve 13. Formed on the shaft near the inner end thereof is a collar 17, and screwed on the outer end of the shaft is a nut 18 coacting with the collar for limiting the rotor and shaft against endwise movement.

Coacting with the inner rotor 14 is an annular outer rotor 19 which surrounds the inner rotor, and removably bolted to the forward edge of the outer rotor is a circular head 20 having an axial torque shaft 21 providing a power shaft. Removably bolted to the rear edge of the rotor 19 is a circular end plate 22 which overlies the rear end of the rotor 14 and freely receives the shaft 15 therethrough.

The shaft 21 of the outer rotor 19 extends through the sleeve 11, and fitting in said sleeve are bearings 23 journaling said shaft. Formed on the shaft at its inner end is a hub 24, and screwed on the outer end portion of the shaft is a nut 25 coacting with said hub for limiting the rotor and shaft against endwise movement. Removably fitting in the outer end of the sleeve 11 is a gland 26 which surrounds the shaft 21 and is secured by suitable cap screws.

Fixed in the forward end of the inner rotor 14 is a number of pins 27. In the present instance, I have shown the use of four of said pins quadrantly spaced and arranged concentric to the axis of the rotor. Formed in the inner side of the head 20 of the outer rotor 19 is a number of sockets 28 corresponding in number to the number of pins used and arranged concentric to the axis of the outer rotor to receive the pins 27.

It is now to be noted that the axis of the inner rotor 14 is offset with respect to the axis of the outer rotor 19, so that a portion of the outer periphery of the inner rotor touches a corresponding portion of the inner periphery of the outer rotor 19 to provide a seal therebetween. Due to the offset between the inner and outer rotors, the pins 27 will, as the two rotors revolve, each describe a circle within its socket 28, and, in the instance shown, the diameter of said circle would be twice the distance of said offset, plus the diameter of any one of said pins. The diameter of the pins 27 and the diameter of the sockets 28 are thus so proportioned relative to each other that, as the two rotors revolve, the peripheries of the pins will follow the peripheral walls of the sockets to coact therewith and couple the rotors to turn in unison at the same speed. Thus, no friction will occur between the contacting areas of the two rotors.

Formed in the inner periphery of the outer rotor 19, as best seen in Figure 7 of the drawings, is a number of cylindrical sockets 29 equally spaced about the inner circumference of said rotor, and formed in the inner rotor 14 is an equal number of correspondingly spaced radial slots 30.

In conjunction with the sockets 29 and slots 30, I employ a number of vanes 31 each provided at its outer edge with a cylindrical bead 32, and at its inner edge with a like bead 33. The beads 32 are of a size to slidably fit in the sockets 29 and are slipped endwise into said sockets to pivotally connect the vanes with the outer rotor 19, while the beads 33 of the vanes are of a size to snugly but slidably and pivotally fit in the slots 30 of the inner rotor 14, the vanes being normally confined between the head 20 and end plate 22 of the outer rotor.

Notwithstanding the fact that the inner and outer rotors are coupled to turn in unison at the same speed, as previously explained, the angularity between any given socket 29 and corresponding slot 30 will, due to the eccentric mounting of the two rotors, change as the rotors revolve. Thus, as will be appreciated from the foregoing, the vanes 31 are pivotally carried by the outer rotor 19 to slidably and pivotally coact with the inner rotor 14 so that, as the rotors revolve, the vanes may tilt to accommodate the changing angles between the sockets and slots of the rotors. Conceivably, the vanes could, if so desired, be pivoted upon the inner rotor 14, in which event the sockets 29 would be provided upon the inner rotor and the slots 30 upon the outer rotor 19. It is to be understood, however, that regardless of which rotor carries the vanes, said vanes will each form a seal between the outer rotor 19 and the inner rotor 14.

The vanes 31 divide the area between the inner rotor 14 and the outer rotor 19 into a number of work chambers which are respectively indicated at 34, 35, 36, 37, 38, 39, 40, and 41. As will be understood, the number of vanes 31 employed, and, consequently, the number of work chambers may be varied, as found most expedient.

Formed in the inner rotor 14 near its rear end, as best seen in Figures 5 and 7 of the drawings, are radial inlet passages respectively indicated at 42, 43, 44, 45, 46, 47, 48, and 49. The inner rotor 14 is further provided near its forward end, as best seen in Figures 6 and 7 of the drawings, with pairs of outlet passages respectively indicated at 50, 51, 52, 53, 54, 55, 56, and 57. As will be seen, an inlet passage, and a pair of outlet passages is provided for each of the work chambers previously noted. The outlet passages are provided in pairs to thereby facilitate the exhaust of the expanded motive fluid from the motor.

Freely received through the inner rotor 14 axially thereof and through the shaft 15 of said rotor is a valve 58, shown in detail in Figure 2 of the drawings. At its outer end, this valve is provided with a nipple 59 to which a hose may be attached for supplying fluid under pressure to the valve, and fixed to the valve at the inner end of said nipple is a hand knob 60 which may be grasped for rotatably adjusting the valve manually.

As best seen in Figures 1 and 4 of the drawings, the hub of the knob 60 is formed with a circumferential groove 61, and engaged through the bearing sleeve 13 are cap screws 62 provided at their inner ends with smooth studs 63 snugly engaging in said groove to limit the valve against endwise movement while at the same time permitting the knob 60 to be freely turned for rotating the valve. The sleeve further carries a binding screw 64 provided at its outer end with a winged head 65 and at its inner end with a smooth stud 66 which also engages in the groove 61 of the knob 60 for limiting the valve 58 against endwise movement. However, the screw 64, unlike the cap screws 62, may be manually adjusted outwardly, as will be grasped, to free the knob and valve for rotation, or inwardly to bind against the knob 60 and lock the valve 58 in adjusted position.

The valve 58 is provided with an axial inlet passage 67 near the inner end of which is a radial port 68 disposed to progressively communicate with the several inlet passages 42, 43, 44, 45, 46, 47, 48, and 49 of the inner rotor 14 as the rotors 14 and 19 revolve.

The valve 58 is further provided with a pair of radial outlet ports 69 disposed to progressively communicate with the pairs of outlet passages 50, 51, 52, 53, 54, 55, 56, and 57 of the inner rotor 14 as the rotors 14 and 19 revolve.

Formed in the valve 58 at its forward end is an axial outlet passage 70 with which the ports 69 communicate, and formed in the head 20 of the outer rotor 19 is an outlet passage 71 in communication with the passage 70 of the valve. As will be noted, the passage 70 is of a diameter to accommodate the eccentric offset of the inner and outer rotors so that the communication between the passages 70 and 71 will be constant. Leading from the passage 71 through the hub 24 of the shaft 21 are divergent outlet passages 72 which open into the casing 10, and formed in the sleeve 11 of said casing is an exhaust passage 73. Preferably, the bearing sleeve 13 is provided with a like exhaust passage 74 so that fluid exhausted into the casing 10 through the passage 72 may not build up a back pressure in the rear end portion of the casing.

Assuming now that the valve 58 is set to effect rotation of the rotors 14 and 19 in a clockwise direction, as shown in the drawings, it will be seen, upon reference to Figure 5, that when the inner end of the passage 45 of the rotor 14 reaches the port 68 of the valve, as the rotors 14 and 19 turn, fluid under pressure will flow through the passage 67 of the valve, port 68, and passage 45 into the work chamber 37, the work chamber 37 being at the time in the approximate position of the chamber 36. Accordingly, at such time, the chamber 36 will be in the approximate position of the chamber 35, and will be sealed at the contacting areas of the two rotors. Thus, the fluid in the chamber 37, at the time, will be prevented from expanding against the trailing vane of said chamber, namely, that one of the vanes 31 between the chambers 36 and 37, to drive the rotors 14 and 19 backwardly, but will be confined to expand against the leading vane of the chamber 37, or, in other words, that one of the vanes 31 between the chambers 37 and 38, to drive the rotors forwardly.

As the rotors 14 and 19 then further revolve to the position shown in Figure 5 of the drawings, the passage 44 of the rotor 14 will be moved into communication with the port 68 of the valve 58 when, as will be understood, the chamber 36 will be filled with the motive fluid while the chamber 35 will be sealed behind the chamber 36 at the contacting areas of the two rotors. Thus, the motive fluid in the chamber 36 will, as will now be grasped, be confined to expand against the leading vane of the chamber 36, or, in other words, that one of the vanes 31 between the chambers 36 and 37, for driving the rotors forwardly.

It is to be noted that the pressure of the motive fluid in the chamber 36 will, in the position of the parts shown in Figure 5 of the drawings, be equal to the pressure of said fluid in the chamber 37, so that the pressure in the chamber 36 will provide an abutment behind the trailing vane of the chamber 37, namely, that one of the vanes 31 between the chambers 36 and 37. Accordingly, the motive fluid in the chamber 37 will be confined to expand against the leading vane of said chamber, or, in other words, that one of the vanes 31 between the chambers 37 and 38, for driving the rotors forwardly. In like manner, the pressure of the motive fluid in the chamber 37 will provide an abutment behind the trailing vane of the chamber 38, namely, that one of the vanes 31 between the chambers 37 and 38, while the pressure of said fluid in the chamber 38 will provide an abutment behind the trailing vane of the chamber 39, namely, that one of the vanes 31 between the chambers 38 and 39. The motive fluid in the chambers 38 and 39 will accordingly be confined to expand against the leading vanes of said chambers, or, in other words, those of the vanes 31 between the chambers 38 and 39 and between the chambers 39 and 40, for driving the rotors forwardly.

As will be perceived, the port 68 in the valve 58 is of such length that fluid under pressure will be fed to the several work chambers in successive pairs, as, for instance, as shown in Figure 5 of the drawings, the pair of chambers 36 and 37. The purpose of the arrangement is to provide an abutment of fluid pressure, as in the trailing chamber 36 of the pair, behind the trailing vane of the leading chamber 37 of the pair, namely, that one of the vanes 31 between the chambers 36 and 37, so that the motive fluid in the leading chamber of the pair will be confined to expand against the leading vane of said leading chamber, or in other words, in the instance taken, against that one of the vanes 31 between the chambers 37 and 38, for driving the rotors forwardly.

At the time the inlet passages 44 and 45 of the rotor 14 are in communication with the inlet port 68 of the valve 58, as shown in Figure 5 of the drawings, the pairs of outlet passages 56 and 57 of said rotor are, as shown in Figure 6, in communication with the pair of outlet ports 69 of said valve. The expanded motive fluid in the work chambers 40 and 41 will thus be permitted to flow from said chambers through the passages 56 and 57, ports 69, passage 70 of the valve 58, and passages 71 and 72 of the head 20 of the rotor 19 to be liberated through the exhaust passages 73 and 74. As will be understood, the several work chambers are thus emptied in successive pairs. Further, it is to be noted that the work chambers 34 and 35, in the position of the parts shown in Figures 5 and 6 of the drawings, are closed at the areas of contact between the rotors 14 and 19.

Following the admission of the motive fluid to the work chambers 36 and 37, as previously described, the work chambers 34 and 35 will move into position to receive a charge of said fluid, while the chambers 38 and 39 will move into position for the liberation of the expanded fluid therefrom, and so on for driving the rotors 14 and 19 and, consequently, the shaft 21.

To reverse the direction of rotation of the rotors 14 and 19, the valve 58 is turned to a position opposite to that shown in Figures 5 and 6 of the drawings, when the motive fluid will be fed to the chambers 40 and 41, and liberated from the chambers 36 and 37, and so on for driving the rotors in a counter-clockwise direction.

Having thus described my invention, I claim:

Mechanism including a circular head flat at its inner side and provided at its outer side with an axial shaft, an annulus carried by said head and cooperating therewith to provide an outer rotor, a solid cylindrical inner rotor disposed within the outer rotor to abut at its forward end against the flat inner side of the head of the outer rotor and removably separable rearwardly endwise from the outer rotor, the inner rotor being provided at its rear end with an axial shaft and being formed with a radial slot closed at its forward end by the flat inner side of the head of the outer rotor, an end plate removably secured to said annulus and overlying the rear end of the inner rotor to retain the inner rotor against rearward endwise separation from the outer rotor and closing the rear end of said slot, the inner side of the head of the outer rotor and the forward circular end of the inner rotor being provided one with a recess and the other with a projecting pin fixed at a single end of the pin to extend at its opposite end into said recess and coact with the peripheral wall thereof coupling the rotors to turn in unison, the projecting end of said pin being inaccessible when the rotors are assembled but being entirely free to permit rearward endwise removal of the inner rotor from the outer rotor without releasing said pin to free the inner rotor for endwise movement, a casing enclosing the rotors, said casing being open at its rear end and provided at its forward end with a bearing sleeve journaling the shaft of the outer rotor, a closure cap removably secured to the open rear end of the casing and provided with a bearing sleeve journaling the shaft of the inner rotor and supporting the inner rotor in eccentric relation to the outer rotor, and a vane pivoted upon said annulus of the outer rotor to slide in said slot of the inner rotor and dividing the area between the rotors into work chambers.

References Cited in the file of this patent

UNITED STATES PATENTS

| | | |
|---|---|---|
| 646,419 | Doran | Apr. 3, 1900 |
| 1,018,737 | Bennett | Feb. 27, 1912 |
| 1,210,042 | Bullard | Dec. 26, 1916 |
| 1,943,637 | Sturm | Jan. 16, 1934 |
| 2,064,635 | Stern | Dec. 15, 1936 |
| 2,089,593 | Bailey | Aug. 10, 1937 |
| 2,127,968 | Bailey | Aug. 23, 1938 |